Figure 1:
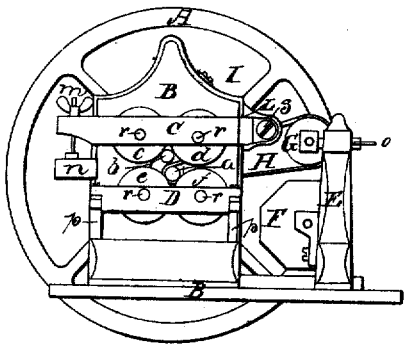
Figure 2:
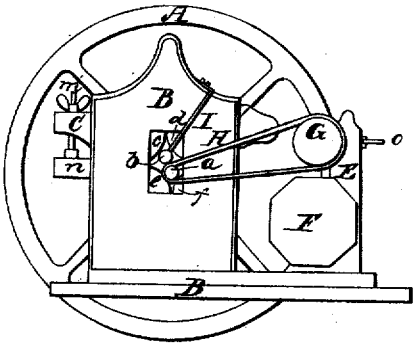
Figure 3:
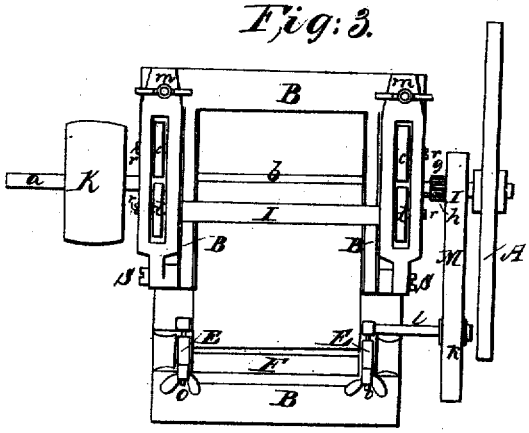

8049X

W. WHITTEMORE, Jr.

COTTON GIN.

Patented Mar. 7, 1834.

N. PETERS, Photo-Lithographer, Washington, D. C.

5/7/1834 RN49X

Mar 7, 1834 263

William Whittemore

The Schedule referred to in these Letters Patent and mak-
ing part of the same containing a discription in the words
of the said William Whittemore Jr himself of his improve
ment in the machine used for separating the seeds from
Cotton commonly called the roller Gin —

To all to whom these presents shall come.

William Whittemore the younger of West Cambridge
in the County of Middlesex and Commonwealth of Massa-
chusetts gentleman sends greeting: Be it known that I
the said William Whittemore have invented made and appli
ed to use a new and useful improvement in the machine
used for separating the seeds from Cotton commonly called
the roller gin. Which new invention and improvement
is specified and described in and by these presents. figure
numbered one in the drawing hereto annexed which drawing
is to be taken and considered as a part of this specification
represents a side view of the said machine. figure numbered
two in the said drawing represents a sectional view
of the said machine and figure numbered three in the said drawing represents
a birds eye view of the said machine. The same parts of
the machine are designated by the same letters in all the
said figures. The sizes dimensions and proportions herein
given of the several parts of the machine are those of the like
parts of a machine which I have applied to use and deem
in that regard best adapted for the purposes herein mentioned A designates the balance wheel attached to the end of
the lower steel roller a, which wheel is of cast iron and
seventeen inches and a half in diameter. B, B, B desig
nates the sides and bottom of the machine which are also
of cast iron the sides are seven and a half inches wide, [illegible]
en eighths of an inch thick at the top and an inch and
seven eighths at the bottom and thirteen inches in height [illegible]

(1) D [illegible]

from the bottom to the top of the peak. The sides are about nine inches apart from each other and are fastened to the bottom each by two screws passing up through the bottom parts of the frame into the sides. C.C. designate pieces of iron eleven inches and one quarter long and an inch and three quarters deep in the deepest part, and two inches thick in the thickest part. One of these pieces of iron is attached to one side of the frame B. on the outside thereof by means of a bolt S. with a screw at the end, which bolt passes through a hole near the end of the piece of iron C. and screwed into the projection L. which forms a part of the said B. and said piece of iron is movable upon the bolt S. as upon a hinge or [illegible] swivel. The other of these pieces of iron is attached in the same manner by a bolt S. to the other side of the frame B on the outer side thereof. In each of these pieces of iron C.C. is a slot six inches and a quarter long and three quarters of an inch wide made entirely through the whole depth of the same pieces of iron from the tops to the undersides thereof. D.D. designate pieces of iron seven inches and a half at the longest part one inch and seven eighths in thickness, and one and three quarters inch deep. One of these pieces of iron is fastened to the projections p.p. on one side of the frame B on the outside thereof under one of the pieces of iron C above described by a screw at each end, the other of these pieces of iron D. is fastened in like manner to like projections on the other side of the frame B on the outside thereof under the other piece of iron C. above described. These pieces of iron D.D. have slots made through them from the tops to the under sides thereof, in a similar manner and of similar dimensions to the slots in the pieces of iron C.C. above described. R.R. designate two posts of cast iron eight inches and three quarters high and one and fifteen sixteenths
of an inch wide at the bottom and tapering to one and seven
sixteenths of an inch at the top and are the same distance
apart from each other as the sides above described and the
centres of these posts are about eight inches and three
eighths of an inch distant from the centres of the sides. B. D. designates
what I term the cleaner and for the purpose of taking the cot-
ton from the band H. It is made of hard wood and is
an octagon ~~form~~ four inches and a half in diameter
from side to side and nine inches long and has gudg-
eons which turn in moveable struts screwed to the posts
B. B. which struts have slots in them so that they may
be moved up and down and fixed by the screws at
any convenient place so as to bring the cleaner D. suffi-
ciently near to the band. H. G. designates a roller of hard
wood about two inches and a half in diameter and
nine inches long, over which the band H passes. This
roller has gudgeons which turn on bearings in the heads
of the bolts c, c. which pass through the upper ends of the
posts B. B. and are four inches and a half long on the
outer ends of which bolts screws are cut for about two
inches and a half, to which thumb nuts are adapted
so as to bring the heads of the bolts nearer or further
distant from the posts B. B. in order to regulate the
tightness of the band H. The roller G. is directly
above the cleaner D. H. designates an endless band of
neats leather nine inches wide which passes over the
steel roller a, and the wooden roller G. sufficiently
tight to cause it to revolve. It is formed by paring
down each end of a suitable piece of neats leather and
causing the ends to lap over each other so that the band
may be of an uniform thickness and cementing them
together with a cement made of the Russian [illegible] dissolved dissolved in brandy and water or water. After the
band is thus formed a coat of glue is to be put over the
whole outside thereof with a brush and after the glue thus
put on is dry a coat of the Russian Isinglass thus dissolved
as aforesaid is to be put over it with a brush in order to form
a hard crust upon the surface of the leather and to make
the leather more hard and firm. What I term the guard
which is made of thick sheet iron is designated by I. It is
made four inches wide and nine inches long and laps
over at the top about one inch so as to be fastened and
kept in its place by screws x which pass through it into
the sides of the frame B.B. above described. The lower edge
of this guard is made to come nearly in contact with the
upper steel roller b. about the centre of the side thereof near-
est the roller G. It is fixed about thirty one degrees from
a perpendicular the top inclining towards the roller G. It
is designed to prevent the cotton after having passed beneath
the upper steel roller b from being carried round and back
upon and by said roller, K. designates ~~the~~ a pulley for
driving the machine fixed upon the end of the lower
steel roller a. or rather upon an extension of that roller
six inches in diameter and three inches thick and
made of hard wood. L.L. designate projections being
part of the sides B.B. herein before referred to. a. de-
signates the lower steel roller two feet two inches and
a half in length from end to end and one foot four inches
and three eighths of an inch between the pinion h. on the
one side and the driving pulley K. on the other side, and
the diameter of this roller between the bearings is thirteen
sixteenths of an inch. It bears and turns upon the friction
rollers e.f. e.f. on each side of the machine, and is
twelve inches and three eighths in length between these bear-
bearings." All these bearings grooved or cut about one six-
teenth tenth of an inch deep and five eighths of an inch wide for
the friction rollers to work in. The band H before mention-
ed passes over this roller and is carried around by it by
the bearing and pressure of the upper roller b. upon it. The
roller a. has a brass pinion, h. near one end with twelve
teeth close to the pulley i, which works into a brass pinion
g. upon the upper roller b. having the same number of teeth
next to the pinion h. this steel roller a. has upon it a fix-
ed pulley i of hard wood three inches and one half in di-
ameter and one inch and one eighth in thickness over
which the band M. passes in order to turn the pulley k.
attached to an extension of one of the gudgeons of the drum
I. so as to cause it to revolve when the roller a. is put
in motion. b. designates a steel roller fifteen inches and
five eighths long, from end to end, and twelve inches and
three eighths between the bearings and thirteen sixteenths
of an inch in diameter between the bearings. At the bear-
ings it has grooves cut in a similar manner and for a
like purpose as those in the other roller, a. It bears
upon the band H which passes over the lower roller a.
and also up against the friction rollers c. d. c. d. and
has a pinion g. on one end with twelve teeth which
mesh into the pinion h. on the roller a. so that the
upper roller b may be turned by means of these pin-
ions by the turning of the lower roller a. This roller is
of cast steel and highly polished to prevent the seeds
from being drawn through between it and the band
on the lower roller a. c. d. c. d. designate friction
rollers of cast iron, each two inches and seven eighths
in diameter and five eighths of an inch thick, two
of which turn in the slots before described in each
of the pieces of cast iron C. C. upon fixed steel bolts
n. n. which pass through one side of the pieces of cast iron

C.

C. and are screwed in to the other by means of a screw cut at the end of the bolts. These rollers bear upon the upper steel roller, b, where grooves are cut as before mentioned to prevent the roller from sliding from its place. e, f, e, f, designate similar cast iron friction rollers of similar dimensions, two of which turn in each of the slots before described in the pieces of cast iron D. D. upon similar bolts r. r. upon which friction rollers the under steel roller, a, bears at the grooves cut in it for a like purpose as those cut in the upper roller g. and h, are the pinions before referred to and described. i, designates the pulley before described for communicating the motion of the roller a. to the cleaner F. k, designates the pulley before referred to attached to the extension of one of the gudgeons of the cleaner F. This pulley is of hard wood six inches and a half in diameter and one inch and one eighth thick and it is fastened on the end of the extended gudgeon by means of a screw and nut. l. designates the extension of the gudgeon before mentioned made of wrought iron. m. m. designate screws five inches long and about three eighths of an inch in diameter which at the lower end are screwed into the projections n. n. being parts of the sides B, B. before referred to. the upper ends of which screws pass through the pieces of cast iron C. C. before referred to so that by means of thumb nuts screwed upon the upper end of these screws the pieces of cast iron C. C. may be screwed down so as to regulate the bearing and pressure of the friction rollers e. e. e. e. upon the upper steel b. n. n. designate the projections being part of the sides B. B. for receiving the ends of the screws m. m. before mentioned, O. O. designate the bolts before referred to and described p. p. designate the projections before before referred to being part of the sides B. B. The pieces of iron C. C. should be screwed down by means of the screws and thumb nuts before referred to so as to make the friction roller c, d, c, d. bear sufficiently hard upon the polished steel roller b. to cause it to bear sufficiently hard on the band H, to make it revolve and draw the cotton through between it and the band H, and at the same time to prevent the seeds from passing through and thereby to separate them from the cotton. By means of the friction rollers the machine is moved much easier and they prevent the steel rollers a, and b, from being heated so as to injure the band or the cotton when the machine is moving with great velocity. The machine may be driven by steam, horse, water or any sufficient power at the rate of about five hundred revolutions a minute. It is deemed best that the rollers a, and b, should be of about the same diameter. These rollers ought to be of the best cast steel [illegible] in order that they may be stiff and not liable to spring as will iron or other metals when the rollers are of the above size and dimensions. The size above described for the roller, a, is deemed best, for if it were in any considerable degree smaller it would be liable to spring in the middle, and thereby cause the cotton to be clogged in the machine, and if it were in any considerable degree larger the seeds would be liable to be drawn in by it. By the roller b, being small and uncovered and highly polished it does not act upon the seeds so as to draw them in. The cleaner b' should be made to revolve as near the band H. as may be without touching it when the machine is put in operation. By motion communicated to the pulley K. the lower steel roller a, is thereby made to revolve and by means of the hinging pin

5/7/1834 8049X

270.

before described, to turn the upper steel roller b, which bears
hard upon the band H. and there by to cause the band H.
to revolve and the roller G, with it, and at the same time
by means of the pulleys i, k, the band M, the cleaner I' is
made to revolve. The machine is fed by hand in the
same way as the roller gins now in use. The cotton
passes through between the steel roller b. and the band
H. which passes over the under roller, a, and the wooden
roller G. and after passing through as aforesaid the cotton
passes along on the band H. and is taken off by the cleaner
I', which in revolving strikes against it. A tin funnel
with a long tube may be placed under the steel rollers
so as to receive the seeds as they fall and conduct them
into a receptacle prepared for receiving them. Instead
of the bolts r, r, r, r, the friction rollers may have an
[illegible] fixed in them with gudgeons to revolve in boxes or
slots made in the pieces of iron C. C. and D. D. before
described, and this mode is deemed preferable on account
of its being rather more easy to apply oil to the gudgeons.
The pinions g. h. and also the friction rollers may
be made of wrought iron or other suitable metal, but
will be better if made of steel than of other metal.
The size, dimensions and proportions of the several parts
of the machine may be somewhat varied at discretion
excepting however that the steel rollers a and b cannot
be advantageously made longer or larger or smaller
in any considerable degree than the dimensions above
given for the reasons before stated, but these rollers may
be made shorter than the above dimensions and the rest
of the machine adapted to them and they will in this
case answer the purpose tolerably well, but the length
above given is deemed preferable. Rollers may be
made of hard and stiff metal other than steel that may will answer some useful purpose, especially when the ma-
chine is not driven with great velocity. but in this case
they ought at least to be three inches shorter to prevent
their springing or breaking. and for a like reason the
balance wheel ought to have a gudgeon on the outer
side thereof, turning in a box in a fixed post or frame
unless the under roller be of steel and the upper roller
only of other hard and stiff metal. which will also answer
some useful purpose, in which last mentioned case the
exterior gudgeon to the balance wheel will not be necessary
unless a heavier balance wheel than that above des-
cribed is used; the above described balance wheel weighing
about eighteen pounds. If a balance which consider-
ably larger or heavier be used it will be expedient
to have this exterior gudgeon to turn in a box in a fixed
post as aforesaid, even with steel rollers such as above
described. But a metal so strong, hard and stiff is re-
quired for the above purpose, that the steel rollers such
as first above described are deemed far preferable to any
other. as being less liable to spring or break than any
other rollers of the same size and length. What I claim
as new and of my invention and all which I claim as my
invention and improvement in the above machine is the
construction, application and use of such guard, as I term
it as is herein before described and referred to, for the pur-
pose aforesaid, and the construction, application and use of
such metallic rollers as aforesaid designated by a, and b,
in the drawing herein annexed with a band over the lower
roller a, in connection and combination with such frie-
tion rollers c, d, c, d, and e, f, e, f, as aforesaid for the
purpose of separating the seeds from cotton as aforesaid.
Intestimony that the above is a true specification of my
said new invention and improvement I have hereto set
my 272. 5/7/1834 8049X my hand this twenty first day of January in the year of our Lord, eighteen hundred and thirty four Witnesses Br. Rand William Whittemore Jr.

Francis Gardner Jr.

Exd.

H.G.

[3278 w.s.